United States Patent
Cruse et al.

(10) Patent No.: US 11,743,318 B2
(45) Date of Patent: *Aug. 29, 2023

(54) SYSTEM AND METHOD FOR GENERATING A TWO-DIMENSIONAL SELECTABLE USER EXPERIENCE ELEMENT

(71) Applicant: JPMorgan Chase Bank, N.A., New York, NY (US)

(72) Inventors: Bradley Howard Cruse, Rowlett, TX (US); Uri Klein, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/846,735

(22) Filed: Jun. 22, 2022

(65) Prior Publication Data

US 2022/0329646 A1 Oct. 13, 2022

Related U.S. Application Data

(63) Continuation of application No. 17/019,809, filed on Sep. 14, 2020, now Pat. No. 11,399,080.

(51) Int. Cl.
*H04L 67/01* (2022.01)
*G06F 9/451* (2018.01)
*G06F 3/0481* (2022.01)
*H04L 67/02* (2022.01)

(52) U.S. Cl.
CPC ............ *H04L 67/01* (2022.05); *G06F 3/0481* (2013.01); *G06F 9/451* (2018.02); *H04L 67/02* (2013.01)

(58) Field of Classification Search
CPC ....... H04L 67/01; H04L 67/02; H04L 67/131; G06F 3/0481; G06F 9/451
See application file for complete search history.

(56) References Cited

U.S. PATENT DOCUMENTS

| | | |
|---|---|---|
| 2009/0217240 A1 | 8/2009 | Motoyama et al. |
| 2013/0205192 A1 | 8/2013 | Spada et al. |
| 2019/0340219 A1 | 11/2019 | Schoedl |
| 2021/0342785 A1* | 11/2021 | Mann ................ G06F 40/18 |

* cited by examiner

*Primary Examiner* — Cao H Nguyen
(74) *Attorney, Agent, or Firm* — Greenblum & Bernstein, P.L.C.

(57) ABSTRACT

Various methods, apparatuses/systems, and media for generating a two-dimensional selectable user experience (UX) element are disclosed. A client device having a graphical user interface (GUI) for receiving user input is configured to run interface applications. The client device is coupled with one or more server devices via a communication network. The one or more server devices provides user interface (UI) metadata. A processor causes a receiver to receive the UI metadata from the one or more server devices; generates, at the client device, a two-dimensional (2D) selectable user experience (UX) element based on the received UI metadata; receives a single action user input to select a single desired field, which conveys two desired actions, from the 2D selectable UX element; and executes the two desired actions based on the selected single desired field from the 2D selectable UX element.

20 Claims, 11 Drawing Sheets

SYSTEM AND METHOD FOR GENERATING A TWO-DIMENSIONAL SELECTABLE USER EXPERIENCE ELEMENT

CROSS-REFERENCE TO RELATED APPLICATION

This is a Continuation of U.S. application Ser. No. 17/019,809, filed Sep. 14, 2020, the disclosure of which is hereby incorporated by reference in its entirety.

TECHNICAL FIELD

This disclosure generally relates to user interface, and, more particularly, to methods and apparatuses for generating a two-dimensional selectable user experience (UX) element, thereby allowing a user to select one item out of a two-dimension table or matrix instead of selecting one item out of a list.

BACKGROUND

Today, a form (e.g., a web-service) where users are required to select a time window to be used for a certain analysis or a certain graph, sometimes there appears to be a plurality of pre-defined time windows for selection rather than allowing the users to freely choose a start or an end period.

In addition, certain calculations or graphs may require the selection of time windows that may broadly be aggregated into several "buckets" such as "the last complete week or month or quarter, etc." versus "the current week or month or quarter, etc. to-date" versus "rolling equivalent of week or month or quarter, etc."

Conventional user experience (UX) patterns may allow either for the selection of any one time-window out of a "flat list" of all options, or require a nested, two-step process where the user first select the duration needed (week or month or quarter, etc.) and then the pattern (last complete versus to-date versus rolling window)—or the other way around. There appears to be no known UX pattern that allows for the selection of such a time window within a single step that conveys that nature of the separate "buckets."

SUMMARY

The present disclosure, through one or more of its various aspects, embodiments, and/or specific features or sub-components, provides, among other features, various systems, servers, devices, methods, media, programs, and platforms for generating a two-dimensional selectable user experience (UX) element, thereby allowing a user to select one item out of a two-dimension table or matrix instead of selecting one item out of a list, but the disclosure is not limited thereto.

According to an aspect of the present disclosure, a method for generating a two-dimensional selectable user experience (UX) element by utilizing one or more processors and one or more memories is disclosed. The method may include: providing a client device having a graphical user interface (GUI) for receiving user input, wherein the client device is configured to run interface applications; coupling the client device with one or more server devices via a communication network, the one or more server devices having user interface (UI) metadata; receiving the UI metadata from the one or more server devices; generating, at the client device, a two-dimensional (2D) selectable user experience (UX) element based on the received UI metadata; receiving a single action user input to select a single desired field, which conveys two desired actions, from the 2D selectable UX element; and executing the two desired actions based on the selected single desired field from the 2D selectable UX element.

According to a further aspect of the present disclosure, wherein the 2D selectable UX element is in the form of a table or a matrix, and the method may further include: receiving user input to select only one cell from the table or the matrix; and executing the two desired actions based on the selected one cell from the table or the matrix.

According to a further aspect of the present disclosure, a system for generating a two-dimensional selectable user experience (UX) is disclosed. The system may include a client device having a graphical user interface (GUI) for receiving user input, wherein the client device is configured to run interface applications; one or more server devices coupled with the client device via a communication network, wherein the one or more server devices having user interface (UI) metadata; and a processor embedded within the client device. The processor may be configured to: receive the UI metadata from the one or more server devices; generate, at the client device, a two-dimensional (2D) selectable user experience (UX) element based on the received UI metadata; receive a single action user input to select a single desired field, which conveys two desired actions, from the 2D selectable UX element; and execute the two desired actions based on the selected single desired field from the 2D selectable UX element.

According to another aspect of the present disclosure, wherein the 2D selectable UX element is in the form of a table or a matrix, and the processor may be further configured to: receive user input to select only one cell from the table or the matrix; and execute the two desired actions based on the selected one cell from the table or the matrix.

According to another aspect of the present disclosure, a non-transitory computer readable medium configured to store instructions for generating a two-dimensional selectable user experience (UX) element is disclosed. The instructions, when executed, may cause a processor to perform the following: coupling a client device having a graphical user interface (GUI) for receiving user input with one or more server devices via a communication network, wherein the client device is configured to run interface applications and wherein the one or more server devices provides user interface (UI) metadata; receive the UI metadata from the one or more server devices; generate, at the client device, a two-dimensional (2D) selectable user experience (UX) element based on the received UI metadata; receive a single action user input to select a single desired field, which conveys two desired actions, from the 2D selectable UX element; and execute the two desired actions based on the selected single desired field from the 2D selectable UX element.

According to a further aspect of the present disclosure, wherein the 2D selectable UX element is in the form of a table or a matrix, and wherein, when executed, the instructions may further cause the processor to perform the following: receiving user input to select only one cell from the table or the matrix; and executing the two desired actions based on the selected one cell from the table or the matrix.

According to yet another aspect of the present disclosure, wherein the 2D selectable UX element is a 2D time-period selectable UX element.

According to a further aspect of the present disclosure, wherein one dimension of the 2D time-period selectable UX element represents selectable time duration and the other dimension of the 2D time-period selectable UX element represents pattern data.

According to another aspect of the present disclosure, wherein the time duration includes one of the following time duration: week, month, quarter, year, but the disclosure is not limited thereto. For example, any other desired time duration may be utilized.

According to an additional aspect of the present disclosure, wherein the pattern data includes one of the following pattern data: last complete data, to-date data, rolling window data, but the disclosure is not limited thereto. For example, any other desired pattern data may be utilized.

According to yet another aspect of the present disclosure, wherein one of the two desired actions may include receiving data within the selected time duration and the other one of the two desired actions includes receiving data from the selected pattern data.

According to another aspect of the present disclosure, wherein the interface applications may include web browsers or standalone client applications which may provide an interface to communicate with the one or more server devices via the communication network in order to communicate user request data.

According to yet another aspect of the present disclosure, wherein the interface applications are operative in a cloud-based computing environment, but the disclosure is not limited thereto.

According to another aspect of the present disclosure, wherein the interface applications are executed within or as virtual machines or virtual servers that are managed in a cloud-based computing environment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
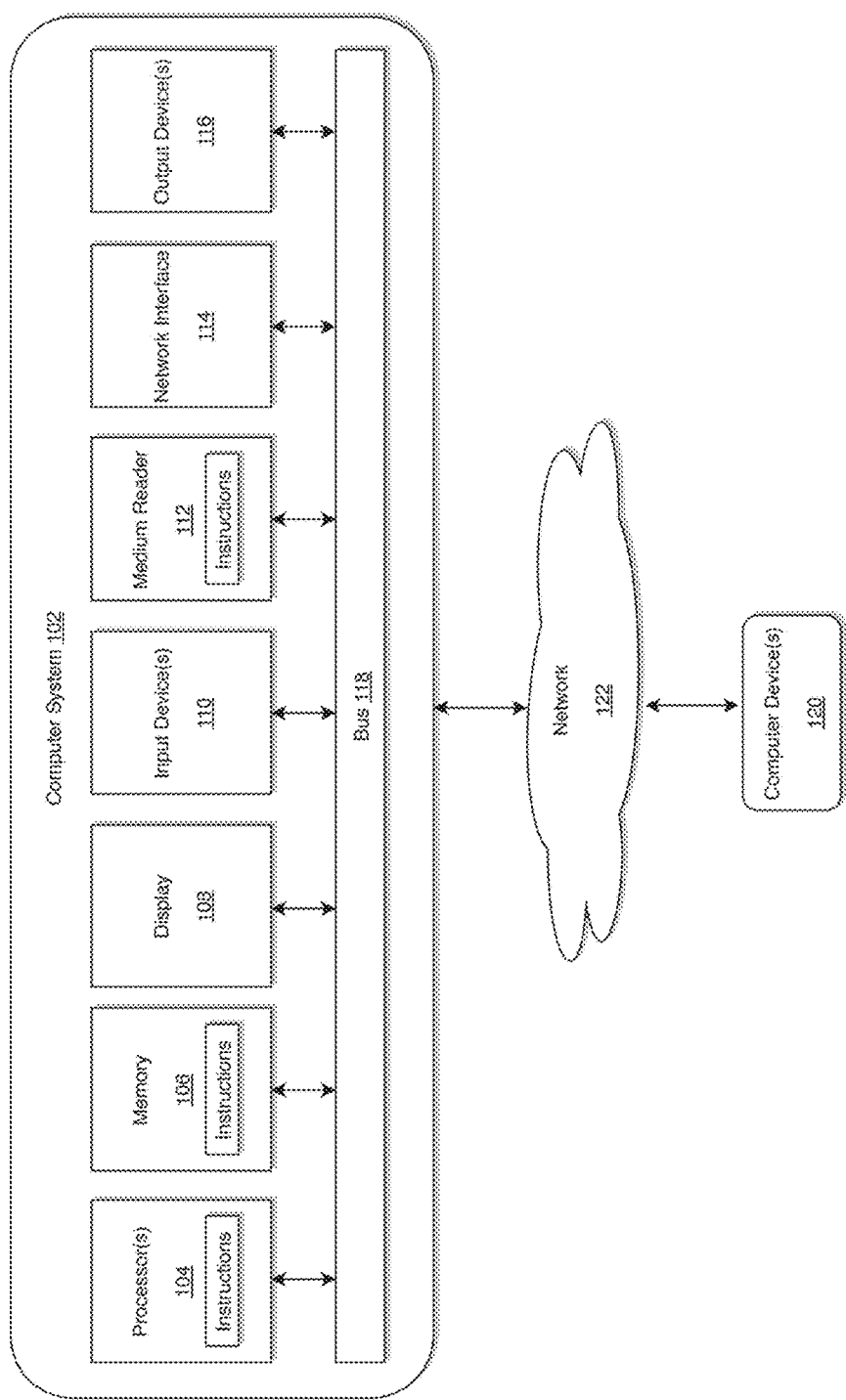
FIG. 1 illustrates a computer system for implementing a 2D selectable UX element generating module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a two-dimensional selectable UX element generating module an automation testing module for generating a two-dimensional selectable UX element, thereby allowing a user to select one item out of a two-dimension table or matrix instead of selecting one item out of a list, but the disclosure is not limited thereto.

Figure 2:
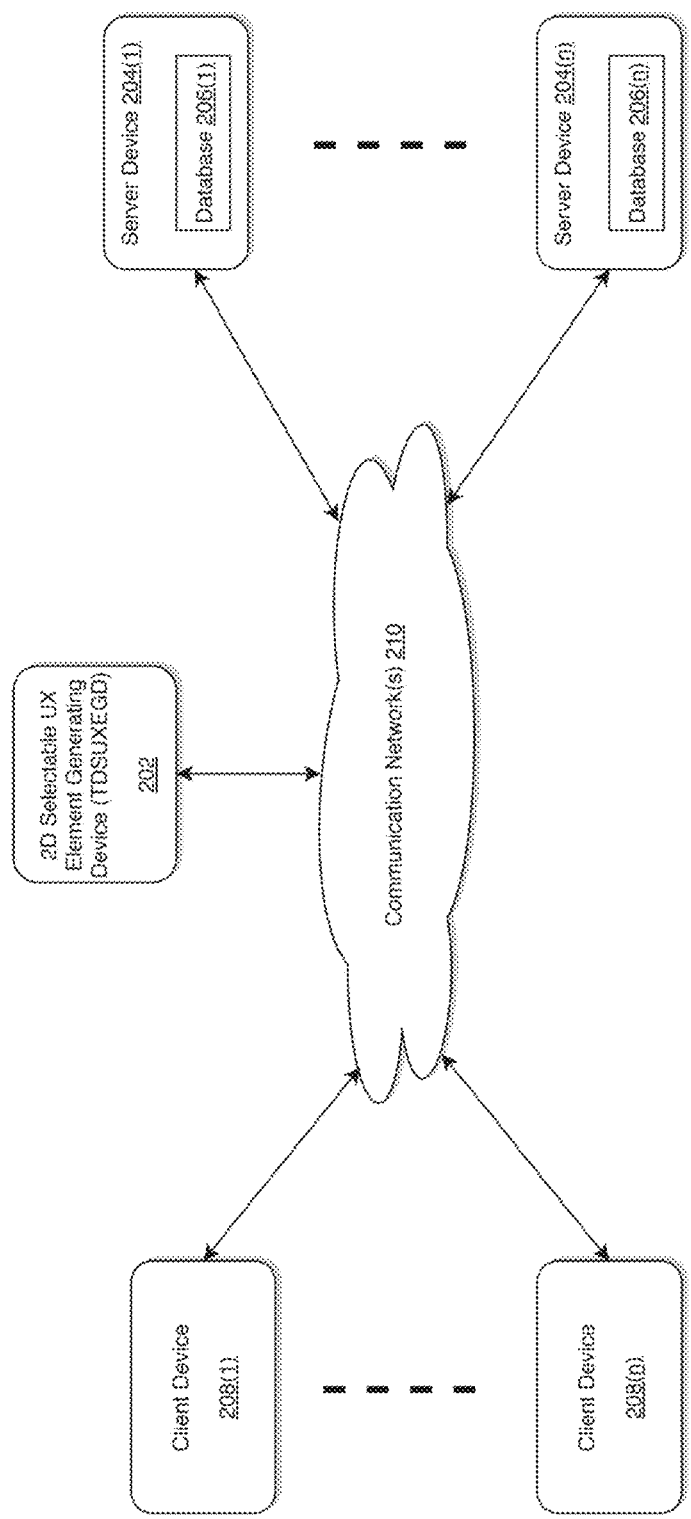
FIG. 2 illustrates an exemplary diagram of a network environment with a 2D selectable UX element generating device in accordance with an exemplary embodiment.

Referring to FIG. 2, a schematic of an exemplary network environment 200 for implementing a two-dimensional selectable UX element generating device (TDSUXEGD) of the instant disclosure is illustrated.

According to exemplary embodiments, the above-described problems associated with conventional testing system may be overcome by implementing a TDSUXEGD 202 having a two-dimensional selectable UX element generating module (not shown) as illustrated in FIG. 2 by generating a two-dimensional selectable UX element, thereby allowing a user to select one item out of a two-dimension table or matrix instead of selecting one item out of a list, but the disclosure is not limited thereto, but the disclosure is not limited thereto.

The TDSUXEGD 202 may be the same or similar to the computer system 102 as described with respect to FIG. 1.

The TDSUXEGD 202 may store one or more applications that can include executable instructions that, when executed by the TDSUXEGD 202, cause the TDSUXEGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TDSUXEGD 202 itself, may be located in virtual server(s) running in a cloud-based computing environment rather than being tied to one or more specific physical network computing devices. Also, the application(s) may be running in one or more virtual machines (VMs) executing on the TDSUXEGD 202. Additionally, in one or more embodiments of this technology, virtual machine(s) running on the TDSUXEGD 202 may be managed or supervised by a hypervisor.

In the network environment 200 of FIG. 2, the TDSUXEGD 202 is coupled to a plurality of server devices 204(1)-204(n) that hosts a plurality of databases 206(1)-206(n), and also to a plurality of client devices 208(1)-208(n) via communication network(s) 210. A communication interface of the TDSUXEGD 202, such as the network interface 114 of the computer system 102 of FIG. 1, operatively couples and communicates between the TDSUXEGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TDSUXEGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TDSUXEGD 202 may be a standalone device or integrated with one or more other devices or apparatuses, such as one or more of the server devices 204(1)-204(n), for example. In one particular example, the TDSUXEGD 202 may be hosted by one of the server devices 204(1)-204(n), and other arrangements are also possible. Moreover, one or more of the devices of the TDSUXEGD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TDSUXEGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(I)-204(n) or other client devices 208(1)-208(n).

According to exemplary embodiments, the client devices 208(1)-208(n) in this example may include any type of computing device that can facilitate the implementation of the TDSUXEGD 202 that may be configured for generating a two-dimensional selectable UX element, thereby allowing a user to select one item out of a two-dimension table or matrix instead of selecting one item out of a list, but the disclosure is not limited thereto, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the TDSUXEGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TDSUXEGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TDSUXEGD 202, the server devices 204(1)-204(n), or the client devices 208(1)-208(n), for example, may be configured to operate as virtual instances on the same physical machine. For example, one or more of the TDSUXEGD 202, the server devices 204(1)-204(n), or the client devices 208(1)-208(n) may operate on the same physical device rather than as separate devices communicating through communication network(s) 210. Additionally, there may be more or fewer TDSUXEGDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
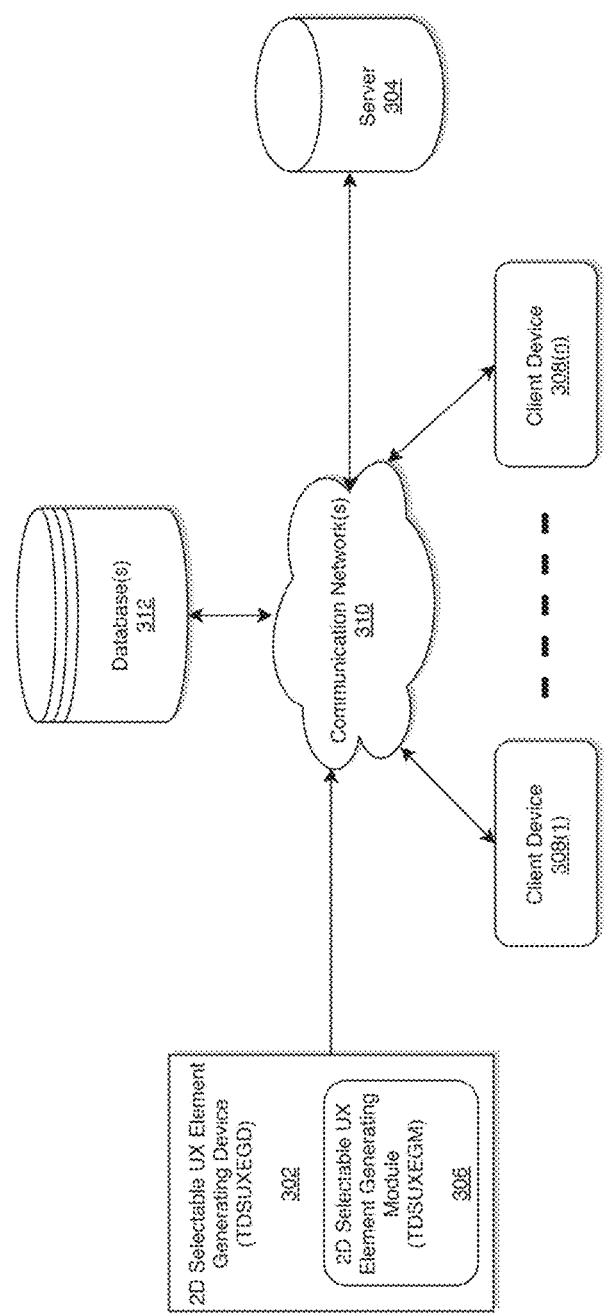
FIG. 3 illustrates a system diagram for implementing a 2D selectable UX element generating device with an automation testing module in accordance with an exemplary embodiment.

FIG. 3 illustrates a system diagram for implementing a two-dimensional selectable user experience (UX) element generating device (TDSUXEGD) with a two-dimensional selectable user experience (UX) element generating module (TDSUXEGM) in accordance with an exemplary embodiment.

As illustrated in FIG. 3, the TDSUXEGD 302 including the TDSUXEGM 306 may be connected to a server 304, and a database(s) 312 via a communication network 310. The TDSUXEGD 302 may also be connected to a plurality of client devices 308(1)-308(n) via the communication network 310, but the disclosure is not limited thereto. According to exemplary embodiments, the TDSUXEGM 306 may be implemented within the client devices 308(1)-308(n), but the disclosure is not limited thereto. According to exemplary embodiments, the client devices 308(1)-308(n) may be utilized for selecting a 2D UX element, but the disclosure is not limited thereto.

According to exemplary embodiment, the TDSUXEGD 302 is described and shown in FIG. 3 as including the TDSUXEGM 306, although it may include other rules, policies, modules, databases, or applications, for example. According to exemplary embodiments, the database(s) 312 may be embedded within the TDSUXEGD 302. Although only one database(s) 312 is illustrated in FIG. 3, according to exemplary embodiments, a plurality of database(s) 312 may be provided. The database(s) 312 may include one or more memories configured to store information including:

rules, programs, production requirements, configurable threshold values defined by a product team to validate against service level objective (SLO), machine learning cadence model, machine learning behavior model, log data, hash values, etc., but the disclosure is not limited thereto. According to exemplary embodiments, the TDSUXEGM 306 may be configured to be storage platform agnostic—configured to be deployed across multiple storage layers.

According to exemplary embodiments, the TDSUXEGM 306 may be configured to receive continuous feed of data from the database(s) 312 via the communication network 310.

As will be described below, the TDSUXEGM 306 may be configured to coupling a client device having a graphical user interface (GUI) for receiving user input with one or more server devices via a communication network, wherein the client device is configured to run interface applications and wherein the one or more server devices provides user interface (UI) metadata; receive the UI metadata from the one or more server devices; generate, at the client device, a two-dimensional (2D) selectable user experience (UX) element based on the received UI metadata; receive a single action user input to select a single desired field, which conveys two desired actions, from the 2D selectable UX element; and execute the two desired actions based on the selected single desired field from the 2D selectable UX element, but the disclosure is not limited thereto.

The plurality of client devices 308(1)-308(n) are illustrated as being in communication with the TDSUXEGD 302. In this regard, the plurality of client devices 308(1)-308(n) may be "clients" of the TDSUXEGD 302 and are described herein as such. Nevertheless, it is to be known and understood that the plurality of client devices 308(1)-308(n) need not necessarily be "clients" of the TDSUXEGD 302, or any entity described in association therewith herein. Any additional or alternative relationship may exist between either or more of the plurality of client devices 308(1)-308(n) and the TDSUXEGD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the TDSUXEGD 302 via broadband or cellular communication. Of course, these embodiments are merely exemplary and are not limiting or exhaustive.

Figure 4:
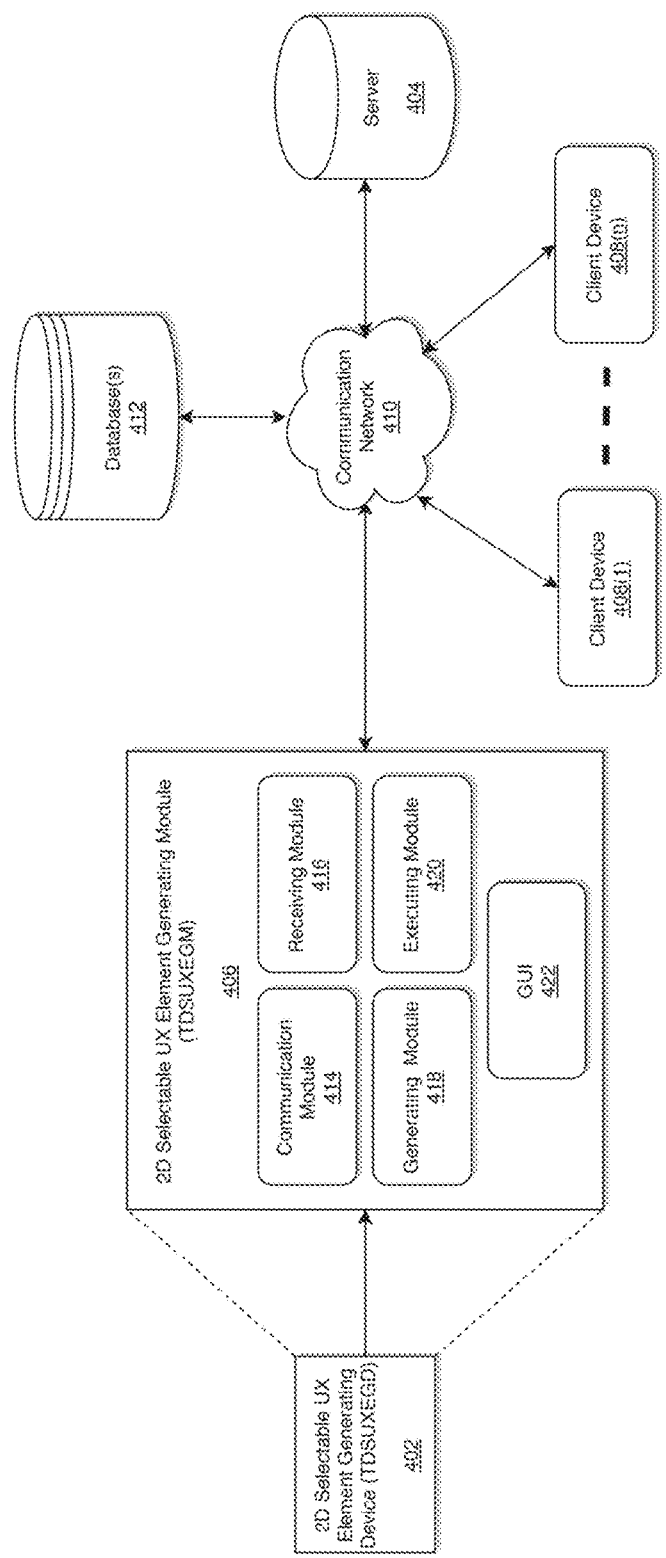
FIG. 4 illustrates a system diagram for implementing a 2D selectable UX element generating module of FIG. 3 in accordance with an exemplary embodiment.

FIG. 4 illustrates a system diagram for implementing a 2D selectable UX element generating module of FIG. 3 in accordance with an exemplary embodiment. As illustrated in FIG. 4, the system 400 may include a 2D selectable UX element generating device (TDSUXEGD) 402 within which a 2D selectable UX element generating module (TDSUXEGM) 406 may be embedded, a database(s) 412, a server 404, client devices 408(1)-408(n), and a communication network 410. According to exemplary embodiments, the TDSUXEGD 402, TDSUXEGM 406, database(s) 412, the server 404, the client devices 408(1)-408(n), and the communication network 410 as illustrated in FIG. 4 may be the same or similar to the TDSUXEGD 302, the TDSUXEGM 306, the database(s) 312, the server 304, the client devices 308(1)-308(n), and the communication network 310, respectively, as illustrated in FIG. 3.

As illustrated in FIG. 4, the TDSUXEGM 406 may include a communication module 414, a receiving module 416, a generating module 418, an executing module 420 and a GUI 422. According to exemplary embodiments, the database(s) 412 may be external to the TDSUXEGD 402 may include various systems that are managed and operated by an organization. Alternatively, according to exemplary embodiments, the database(s) 412 may be embedded within the TDSUXEGD 402 and/or the TDSUXEGM 406.

The process may be executed via the communication network 410, which may comprise plural networks as described above. For example, in an exemplary embodiment, the various components of the TDSUXEGM 406 may communicate with the server 404, and the database(s) 412 via the communication network 410 and the communication module 414. Of course, these embodiments are merely exemplary and are not limiting or exhaustive.

According to exemplary embodiments, the communication network 410 and the communication module 414 may be configured to establish a link between the database(s) 412, the client devices 408(1)-408(n) and the TDSUXEGM 406.

According to exemplary embodiments, each of the communication module 414, receiving module 416, generating module 418, and the executing module 420 may be implemented by microprocessors or similar, they may be programmed using software (e.g., microcode) to perform various functions discussed herein and may optionally be driven by firmware and/or software. Alternatively, each of the communication module 414, receiving module 416, generating module 418, and the executing module 420 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, receiving module 416, generating module 418, and the executing module 420 may be physically separated into two or more interacting and discrete blocks, units, devices, and/or modules without departing from the scope of the inventive concepts.

According to exemplary embodiments, the communication module 414 may be configured to establish a link between a client device (e.g., TDSUXEGD 402) having a GUI 422 for receiving user input with one or more server devices 404 via the communication network 410. The client device may be configured to run interface applications and the one or more server devices 404 may provide user interface (UI) metadata.

According to exemplary embodiments, the receiving module 416 may be configured to receive the UI metadata from the one or more server devices 404. The generating module 418 may be configured to generate, at the client device (e.g., TDSUXEGD 402), a 2D selectable UX element based on the received UI metadata.

According to exemplary embodiments, the receiving module 416 may also be configured to receive a single action user input to select a single desired field, which may convey two desired actions, from the 2D selectable UX element.

According to exemplary embodiments, the executing module 420 may be configured to execute the two desired actions based on the selected single desired field from the 2D selectable UX element.

According to exemplary embodiments, the 2D selectable UX element may in the form of a table or a matrix, but the disclosure is not limited thereto. The receiving module 416 may be configured to receive user input to select only one cell from the table or the matrix, and the executing module 420 may be configured to execute the two desired actions based on the selected one cell from the table or the matrix.

According to exemplary embodiments, the 2D selectable UX element may be a 2D time-period selectable UX element in accordance with a desired use case, but the disclosure is not limited thereto.

Figure 5:
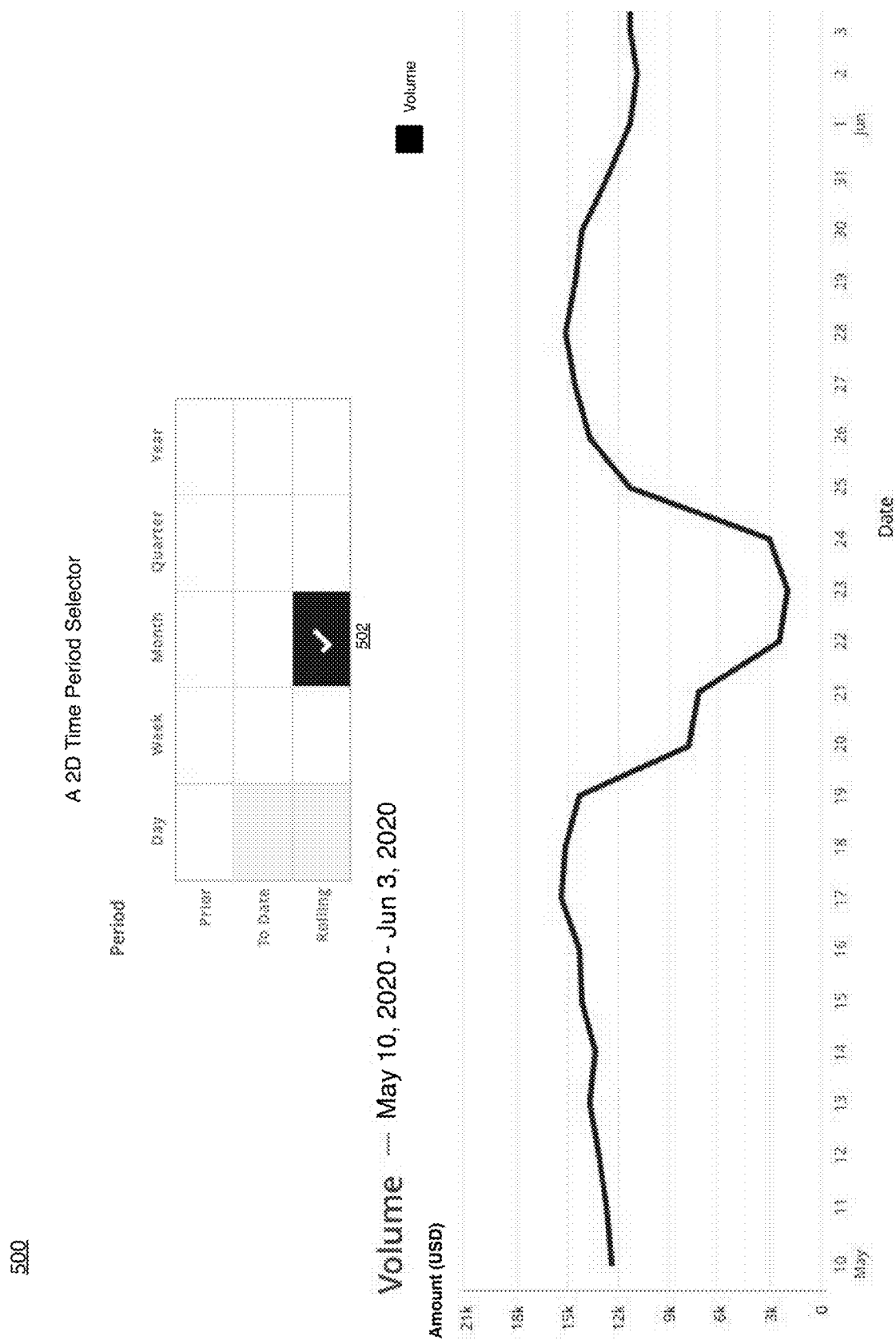
FIG. 5 illustrates an exemplary use case of a 2D time period selector in accordance with an exemplary embodiment.
Figure 6:
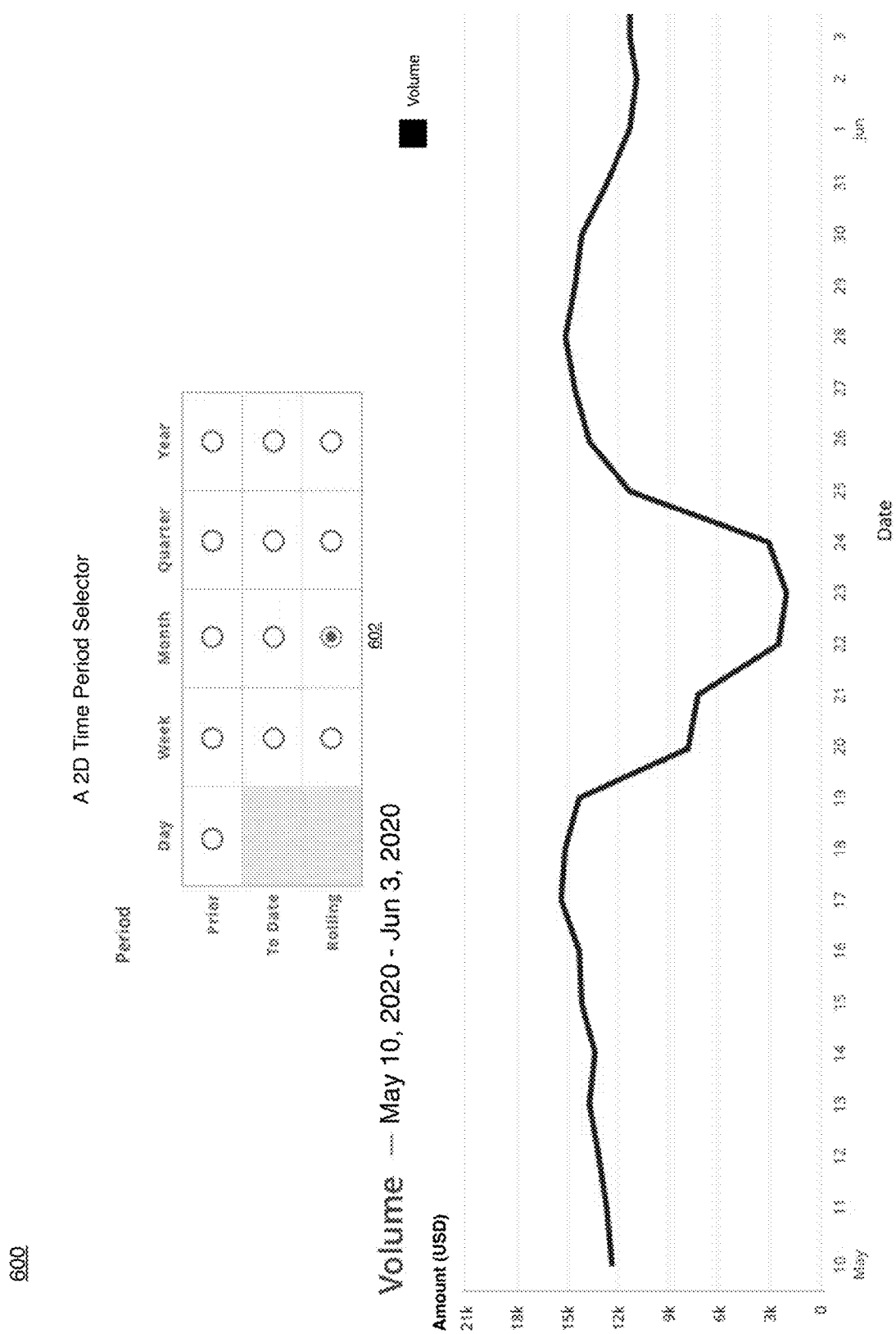
FIG. 6 illustrates another exemplary use case of a 2D time period selector in accordance with an exemplary embodiment.

According to exemplary embodiments, one dimension of the 2D time-period selectable UX element may represent selectable time duration and the other dimension of the 2D time-period selectable UX element may represent pattern data. For example, each of FIGS. 5 and 6 illustrates an exemplary use case of a 2D time period selector in accordance with exemplary embodiments, but the disclosure is not limited thereto.

According to exemplary embodiments, the time duration may include one of the following time duration: week, month, quarter, year, but the disclosure is not limited thereto. For example, any other desired time duration may be utilized.

According to exemplary embodiments, the pattern data may include one of the following pattern data: last complete data, to-date data, rolling window data, but the disclosure is not limited thereto. For example, any other desired pattern data may be utilized.

According to exemplary embodiments, one of the two desired actions may include receiving data within the selected time duration and the other one of the two desired actions may include receiving data from the selected pattern data.

For example, FIG. 5 illustrates an exemplary use case of a 2D time period selector 500 in accordance with an exemplary embodiment, but the disclosure is not limited thereto. In this exemplary embodiment, the TDSUXEGM 406 may be configured to generate onto the GUI 422, a 2D selectable UX element based on the received UI metadata; receive a single action user input to select a single desired field 502 (e.g., selecting a desired rectangular-shaped cell), which conveys two desired actions (e.g., duration=month; pattern=rolling), from the 2D selectable UX element; and execute the two desired actions based on the selected single desired field 502 from the 2D selectable UX element.

For example, FIG. 6 illustrates another exemplary use case of a 2D time period selector 600 in accordance with an exemplary embodiment, but the disclosure is not limited thereto. In this exemplary embodiment, the TDSUXEGM 406 may be configured to generate onto the GUI 422, a 2D selectable UX element based on the received UI metadata; receive a single action user input to select a single desired field 602 (e.g., selecting a desired circular-shaped cell), which conveys two desired actions (e.g., duration=month; pattern=rolling), from the 2D selectable UX element; and execute the two desired actions based on the selected single desired field 602 from the 2D selectable UX element.

Figure 7:
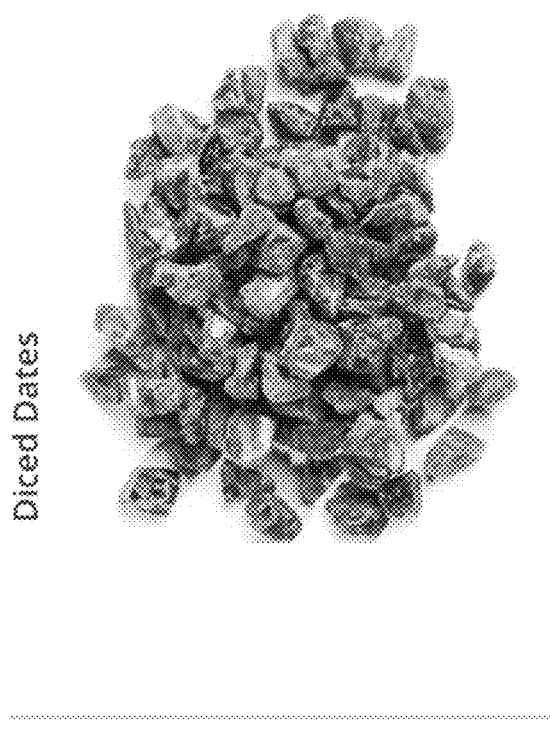
FIG. 7 illustrates an exemplary use case of a 2D selector in accordance with an exemplary embodiment.
Figure 7:
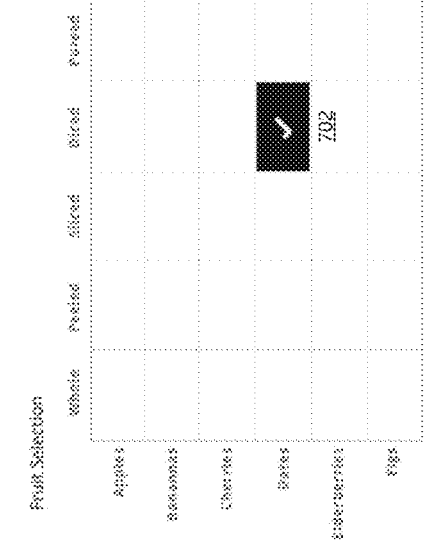

FIG. 7 illustrates another exemplary use case of a 2D selector 700 in accordance with an exemplary embodiment, but the disclosure is not limited thereto. In this exemplary embodiment, the TDSUXEGM 406 may be configured to generate onto the GUI 422, a 2D selectable UX element based on the received UI metadata; receive a single action user input to select a single desired field 702 (e.g., selecting a desired rectangular-shaped cell), which conveys two desired actions (e.g., selected fruit=dates; and the way should be processed=diced), from the 2D selectable UX element; and execute the two desired actions based on the selected single desired field 702 from the 2D selectable UX element.

Figure 10:
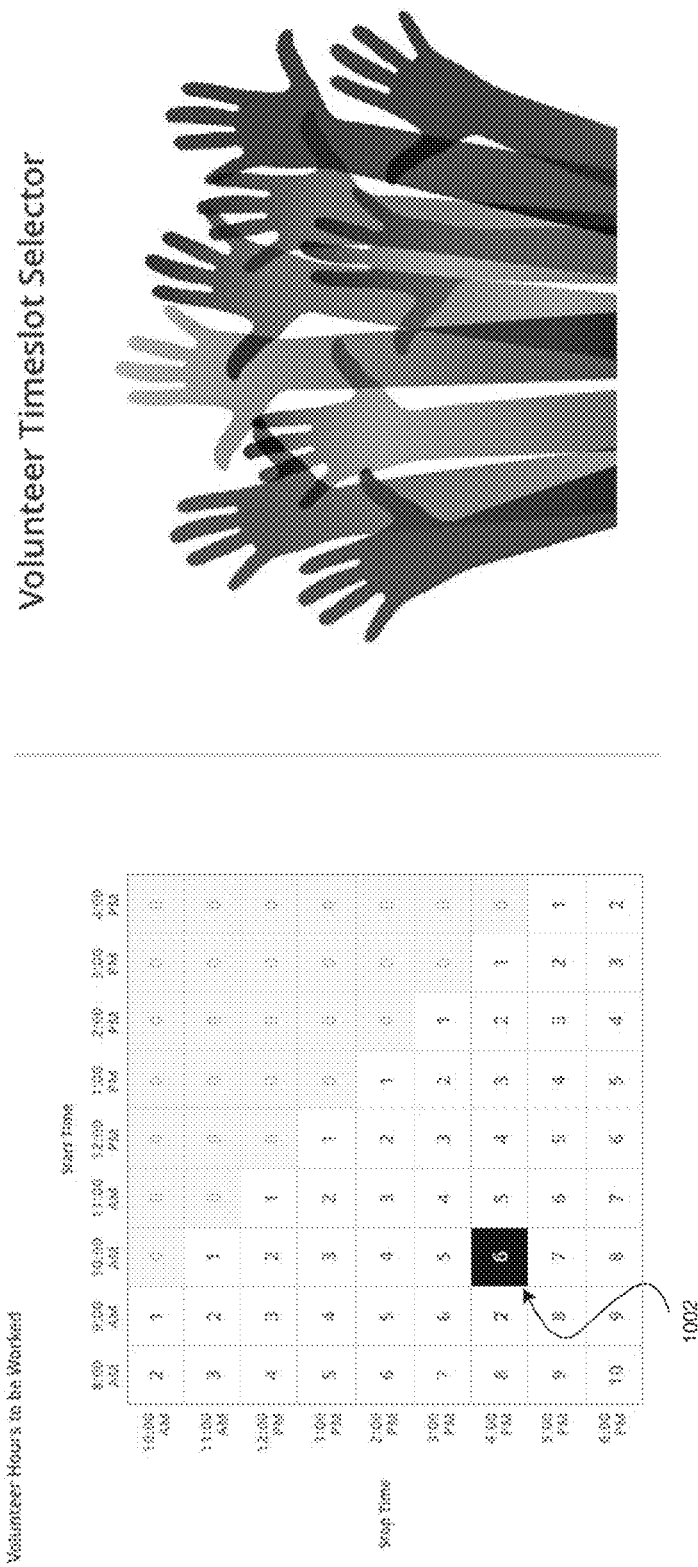
FIG. 10 illustrates another exemplary use case of a 2D selector in accordance with an exemplary embodiment.

FIG. 10 illustrates another exemplary use case of a 2D selector 700 in accordance with an exemplary embodiment, but the disclosure is not limited thereto. In this exemplary embodiment, the TDSUXEGM 406 may be configured to generate onto the GUI 422, a 2D selectable UX element based on the received UI metadata; receive a single action user input to select a single desired field 1002 (e.g., selecting a desired square-shaped cell), which conveys two desired actions (e.g., start time and slope time of volunteer hours to be worked), from the 2D selectable UX element; and execute the two desired actions based on the selected single desired field 1002 from the 2D selectable UX element. In this example, users wanting to volunteer for a specific amount of hours can easily align the desired number of hours to alternative start/stop times.

Figure 8:
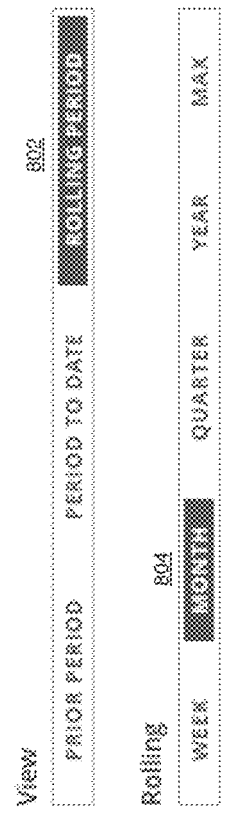
FIG. 8 illustrates a conventional paired toggle selector.

FIG. 8 illustrates a conventional paired toggle selector 800 in accordance with conventional systems and methods. This conventional paired toggle selector 800 is less efficient compared to the selectors as disclosed above in accordance with exemplary embodiments. This conventional paired toggle selector 800 requires two steps (e.g., one for viewing option of rolling period 802 and the other one for month 804 for the selected rolling period) and the user cannot see all possible options at the same time.

Figure 9:
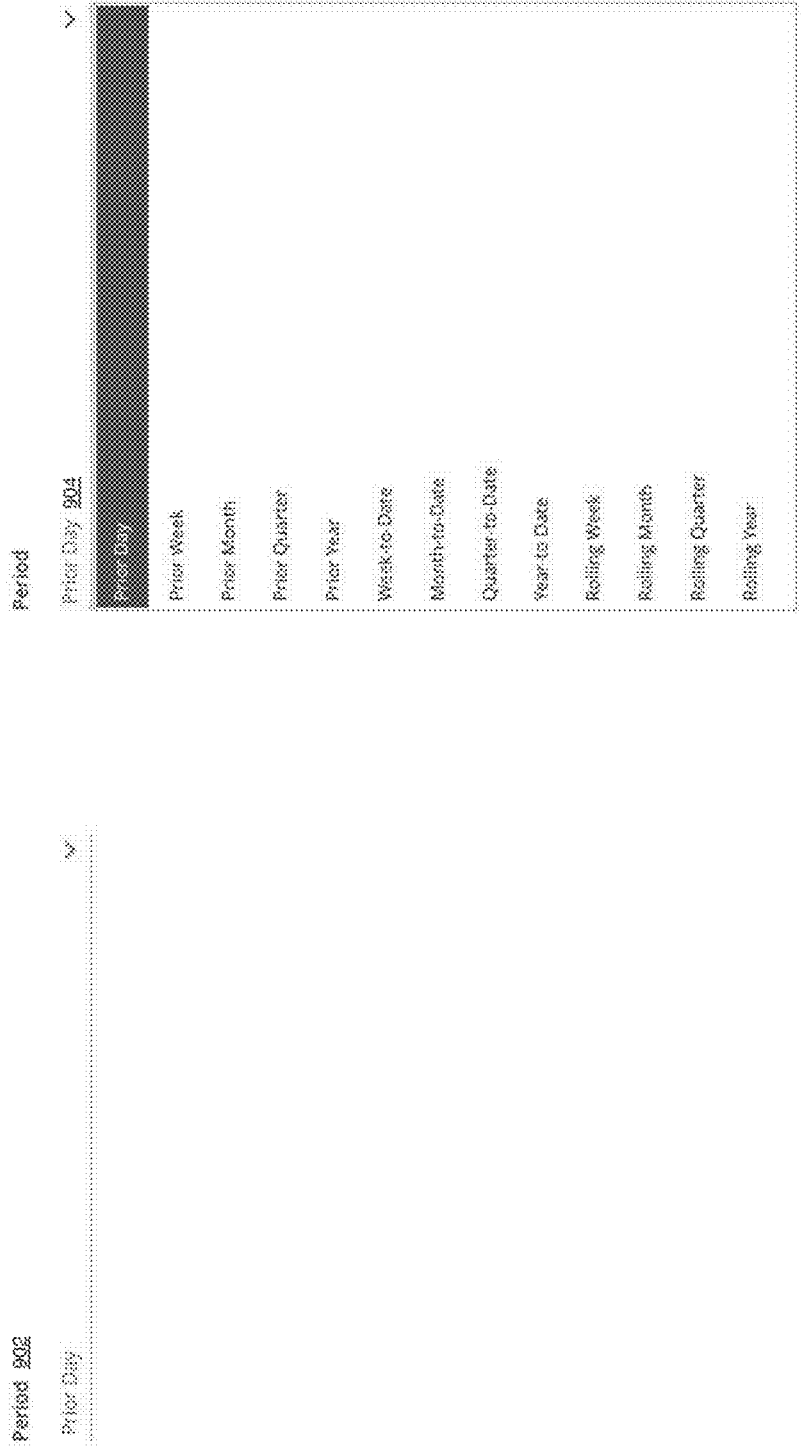
FIG. 9 illustrates a conventional single drop down list selector.

FIG. 9 illustrates a conventional single drop down list selector 900 in accordance with conventional systems and methods. This conventional single drop down list selector 900 is commonly used as UI control. While this may be an efficient method for selecting items that exist in a single dimension (for example, color: red, blue, green), it becomes notably less efficient when two or more dimensions are combined. For example, in this conventional example, the 2D aspect of this data causes a proliferation of choices to support all combinational permutations, resulting an inefficient process.

According to exemplary embodiments, the interface applications may include web browsers or standalone client applications which may provide an interface to communicate with the one or more server devices 404 via the communication network 410 in order to communicate user request data.

According to exemplary embodiments, the interface applications may be operative in a cloud-based computing environment, but the disclosure is not limited thereto.

According to exemplary embodiments, the interface applications may be executed within or as virtual machines or virtual servers that are managed in a cloud-based computing environment.

Figure 11:
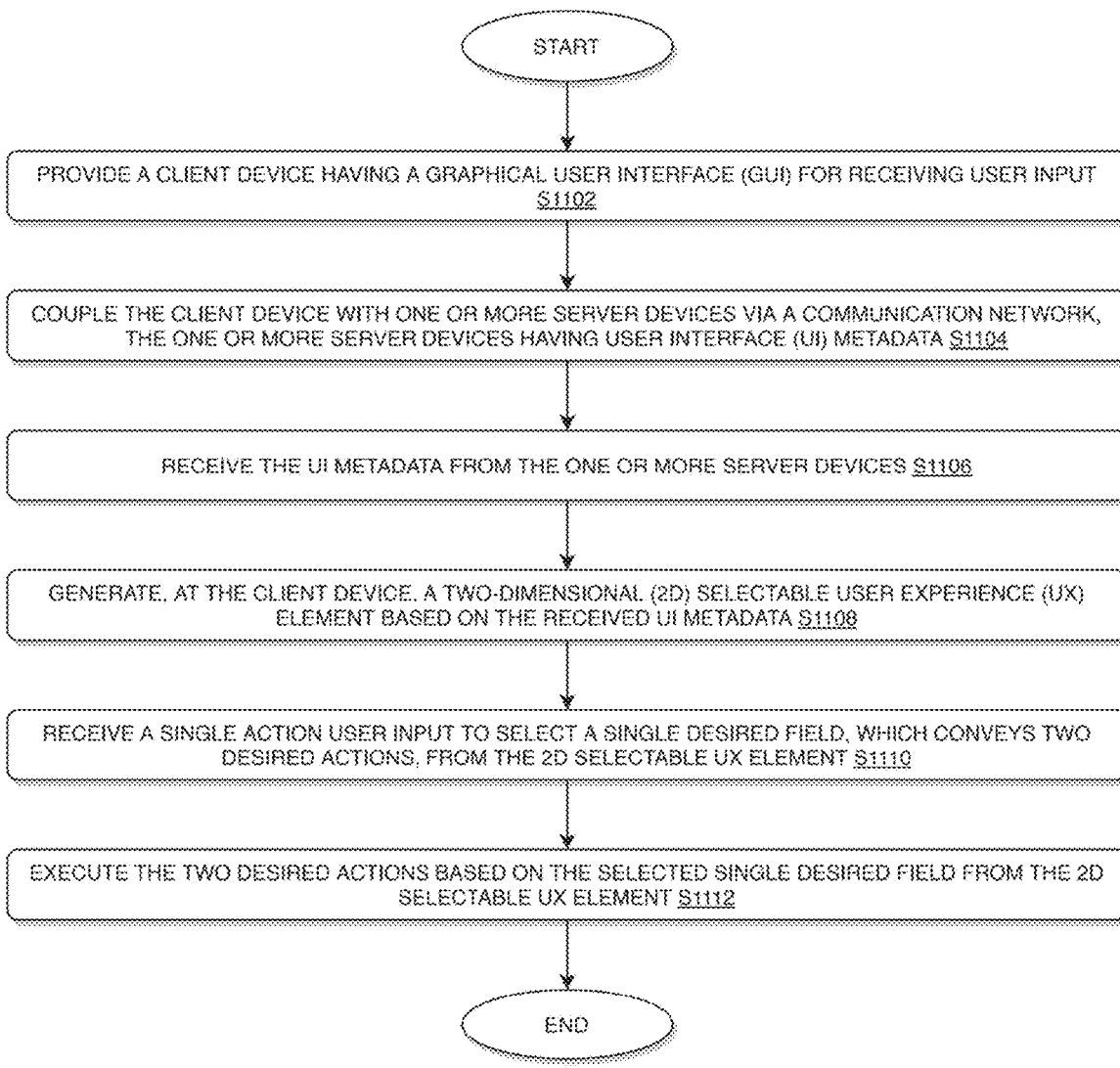
FIG. 11 illustrates a flow diagram for implementing a 2D selectable UX element generating module in accordance with an exemplary embodiment.

FIG. 11 illustrates a flow diagram for generating a two-dimensional selectable user experience (UX) element by utilizing one or more processors and one or memories in accordance with an exemplary embodiment.

In the process 1100 of FIG. 11, at step S1102, a client device having a graphical user interface (GUI) for receiving user input may be provided. The client device may be configured to run interface applications.

At step S1104, the client device may be coupled with one or more server devices via a communication network. The one or more server devices may provide user interface (UI) metadata.

At step S1106, the UI metadata may be received from the one or more server devices.

At step S1108, a two-dimensional (2D) selectable user experience (UX) element may be generated, at the client device, based on the received UI metadata.

At step S1110, a single action user input may be received to select a single desired field, which may convey two desired actions, from the 2D selectable UX element.

At step S1112, the two desired actions may be executed based on the selected single desired field from the 2D selectable UX element.

According to exemplary embodiments, the 2D selectable UX element may be in the form of a table or a matrix, and the process 1100 may further include: receiving user input to select only one cell from the table or the matrix; and executing the two desired actions based on the selected one cell from the table or the matrix.

According to exemplary embodiments, a non-transitory computer readable medium may be configured to store instructions for generating a two-dimensional selectable user experience (UX) element. According to exemplary embodiments, the instructions, when executed, may cause a processor embedded within the TDSUXEGM 406 or the TDSUXEGD 402 to perform the following: coupling a client device having a graphical user interface (GUI) for receiving user input with one or more server devices via a communication network, wherein the client device is configured to run interface applications and wherein the one or more server devices provides user interface (UI) metadata; receive the UI metadata from the one or more server devices; generate, at the client device, a two-dimensional (2D) selectable user experience (UX) element based on the received UI metadata; receive a single action user input to select a single desired field, which conveys two desired actions, from the 2D selectable UX element; and execute the two desired actions based on the selected single desired field from the 2D selectable UX element. The processor may be the same or similar to the processor 104 as illustrated in FIG. 1 or the processor embedded within TDSUXEGD 202, TDSUXEGD 302, TDSUXEGM 306, TDSUXEGD 402, and TDSUXEGM 406.

According to exemplary embodiments, the 2D selectable UX element may be in the form of a table or a matrix, and the instructions, when executed, may further cause the processor 104 to perform the following: receiving user input to select only one cell from the table or the matrix; and executing the two desired actions based on the selected one cell from the table or the matrix.

According to exemplary embodiments as disclosed above in FIGS. 1-7 and 10-11, technical improvements effected by the instant disclosure may include platforms for generating a two-dimensional selectable user experience (UX) element, thereby allowing a UI to receive user's selection of one item out of a two-dimension table or matrix, but the disclosure is not limited thereto. For example, in the example of time-period mentioned above, one dimension of selection may be the duration (week or month or quarter or year, etc.) and the other may be the pattern (last complete vs. to-date vs. rolling window). If presented visually as a table or matrix, the user is only asked to select one "cell" in this two-dimensional interface which uniquely defines the needed time-period in a single action while clearly capturing the nature of the selected time-window.

In addition, according to exemplary embodiments as disclosed above in FIGS. 1-7 and 10-11, technical improvements effected by the instant disclosure may include platforms for applying the UX pattern to any other use cases in addition to time-period selection and may be useful whenever a selection can be projected onto two dimensions. For example, in a use case of fruit processing, one dimension of the two-dimensional selectable UX element may include an action of selecting the type of fruit (e.g., banana, apple, pear, etc.) and the other dimension of the two-dimensional selectable UX element may include an action of selecting form In this fruit processing use case, the receiving module may be configured to receive user input to select only one cell from the two-dimensional selectable UX element (e.g., table or the matrix), and the executing module may be configured to execute the two desired actions based on the selected one cell from the two-dimensional selectable UX element. That is, by selecting only one cell from the table or matrix, two operations are triggered (e.g., picking a fruit and the form as to how the user wants the fruit to be prepared (e.g., whole, diced, sliced, mashed, etc.).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a two-dimensional selectable user experience (UX) element by utilizing one or more processors and one or more memories, the method comprising:
   generating, at a client device configured to run interface applications, a two-dimensional (2D) selectable user experience (UX) element based on received user interface (UI) metadata from one or more server devices operatively connected to the client device via a communication network;
   receiving a single action user input to select a single desired field, which conveys two desired actions, from the 2D selectable UX element; and
   executing the two desired actions based on the selected single desired field from the 2D selectable UX element,
   wherein the 2D selectable UX element is in the form of a table or a matrix, and the method further comprising:
   receiving user input to select only one cell from the table or the matrix; and
   executing the two desired actions based on the selected one cell from the table or the matrix,
   wherein the 2D selectable UX element is a 2D time-period selectable UX element, and
   wherein one dimension of the 2D time-period selectable UX element represents selectable time duration and the other dimension of the 2D time-period selectable UX element represents pattern data.

2. The method according to claim 1, wherein the time duration includes one of the following time duration: week, month, quarter, year.

3. The method according to claim 2, wherein the pattern data includes one of the following pattern data: last complete data, to-date data, rolling window data.

4. The method according to claim 3, wherein one of the two desired actions includes receiving data within the selected time duration and the other one of the two desired actions includes receiving data from the selected pattern data.

5. The method according to claim 1, wherein the interface applications include web browsers or standalone client applications which provide an interface to communicate with the one or more server devices via the communication network in order to communicate user request data.

6. The method according to claim 1, wherein the interface applications are operative in a cloud-based computing environment.

7. The method according to claim 1, wherein the interface applications are executed within or as virtual machines or virtual servers that are managed in a cloud-based computing environment.

8. A system for generating a two-dimensional selectable user experience (UX), comprising:
   a client device having a graphical user interface (GUI) for receiving user input, wherein the client device is configured to run interface applications; and
   a processor embedded within the client device, wherein the processor is configured to:
   generate, at the client device, a two-dimensional (2D) selectable user experience (UX) element based on received user interface (UI) metadata from one or more server devices operatively connected to the client device via a communication network;
   receive a single action user input to select a single desired field, which conveys two desired actions, from the 2D selectable UX element; and execute the two desired actions based on the selected single desired field from the 2D selectable UX element, wherein the 2D selectable UX element is in the form of a table or a matrix, and the processor is further configured to:

receive user input to select only one cell from the table or the matrix; and execute the two desired actions based on the selected one cell from the table or the matrix, wherein the 2D selectable UX element is a 2D time-period selectable UX element, and wherein one dimension of the 2D time-period selectable UX element represents selectable time duration and the other dimension of the 2D time-period selectable UX element represents pattern data.

9. The system according to claim 8, wherein the time duration includes one of the following time duration: week, month, quarter, year.

10. The system according to claim 9, wherein the pattern data includes one of the following pattern data: last complete data, to-date data, rolling window data.

11. The system according to claim 10, wherein one of the two desired actions includes receiving data within the selected time duration and the other one of the two desired actions includes receiving data from the selected pattern data.

12. The system according to claim 9, wherein the interface applications include web browsers or standalone client applications which may provide an interface to communicate with the one or more server devices via the communication network in order to communicate user request data.

13. The system according to claim 9, wherein the interface applications are operative in a cloud-based computing environment.

14. The system according to claim 9, wherein the interface applications are executed within or as virtual machines or virtual servers that are managed in a cloud-based computing environment.

15. A non-transitory computer readable medium configured to store instructions for generating a two-dimensional selectable user experience (UX) element, wherein when executed, the instructions cause a processor to perform the following:

generating, at a client device configured to run interface applications, a two-dimensional (2D) selectable user experience (UX) element based on received user interface (UI) metadata from one or more server devices operatively connected to the client device via a communication network;

receiving a single action user input to select a single desired field, which conveys two desired actions, from the 2D selectable UX element; and executing the two desired actions based on the selected single desired field from the 2D selectable UX element, wherein the 2D selectable UX element is in the form of a table or a matrix, and when executed, the instructions further cause the processor to perform the following:

receiving user input to select only one cell from the table or the matrix; and executing the two desired actions based on the selected one cell from the table or the matrix, wherein the 2D selectable UX element is a 2D time-period selectable UX element, and wherein one dimension of the 2D time-period selectable UX element represents selectable time duration and the other dimension of the 2D time-period selectable UX element represents pattern data.

16. The non-transitory computer readable medium according to claim 15, wherein the time duration includes one of the following time duration: week, month, quarter, year.

17. The non-transitory computer readable medium according to claim 16, wherein the pattern data includes one of the following pattern data: last complete data, to-date data, rolling window data.

18. The non-transitory computer readable medium according to claim 17, wherein one of the two desired actions includes receiving data within the selected time duration and the other one of the two desired actions includes receiving data from the selected pattern data.

19. The non-transitory computer readable medium according to claim 15, wherein the interface applications include web browsers or standalone client applications which may provide an interface to communicate with the one or more server devices via the communication network in order to communicate user request data.

20. The non-transitory computer readable medium according to claim 15, wherein the interface applications are operative in a cloud-based computing environment and wherein the interface applications are executed within or as virtual machines or virtual servers that are managed in a cloud-based computing environment.

* * * * *